(12) United States Patent
Bentvelsen et al.

(10) Patent No.: US 7,178,087 B2
(45) Date of Patent: Feb. 13, 2007

(54) READ-ONLY RECORD CARRIER WITH RECORDABLE AREA IN SUBCODE CHANNEL

(75) Inventors: Petrus Henricus Cornelius Bentvelsen, Eindhoven (NL); Paulus Franciscus Vollebregt, 's-Gravenhage (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/511,209

(22) PCT Filed: Apr. 1, 2003

(86) PCT No.: PCT/IB03/01269

§ 371 (c)(1),
(2), (4) Date: Oct. 13, 2004

(87) PCT Pub. No.: WO03/088247

PCT Pub. Date: Oct. 23, 2003

(65) Prior Publication Data

US 2006/0150060 A1 Jul. 6, 2006

(30) Foreign Application Priority Data

Apr. 18, 2002 (EP) .................................. 02076518

(51) Int. Cl.
*G11C 29/00* (2006.01)

(52) U.S. Cl. ..................................................... 714/763
(58) Field of Classification Search ................ 380/201, 380/202; 714/699
See application file for complete search history.

(56) References Cited

U.S. PATENT DOCUMENTS

| | | | | |
|---|---|---|---|---|
| 4,893,199 A | * | 1/1990 | Okada | 360/48 |
| 5,930,209 A | * | 7/1999 | Spitzenberger et al. | 369/30.05 |
| 6,311,305 B1 | * | 10/2001 | Sollish et al. | 714/784 |
| 6,353,890 B1 | * | 3/2002 | Newman | 713/193 |
| RE37,808 E | * | 7/2002 | Yokota | 369/47.12 |
| 6,425,098 B1 | * | 7/2002 | Sinquin et al. | 714/699 |
| 6,487,155 B1 | * | 11/2002 | Carson et al. | 369/59.13 |
| 6,535,858 B1 | * | 3/2003 | Blaukovitsch et al. | 705/57 |
| 6,715,122 B2 | * | 3/2004 | Carson et al. | 714/769 |
| 6,718,501 B1 | * | 4/2004 | Brody et al. | 714/752 |
| 6,928,040 B2 | * | 8/2005 | Christensen | 369/53.21 |
| 2001/0017973 A1 | * | 8/2001 | Abe | 386/52 |
| 2002/0009033 A1 | * | 1/2002 | Christensen | 369/53.21 |
| 2003/0152009 A1 | * | 8/2003 | Usui et al. | 369/59.25 |
| 2004/0174791 A1 | * | 9/2004 | Saito | 369/59.25 |

\* cited by examiner

*Primary Examiner*—Guy Lamarre
*Assistant Examiner*—Sam Rizk

(57) ABSTRACT

A method of providing a read-only record carrier on which user data can be recorded at predetermined recordable positions of subcode frames of a subcode channel after mastering of said record carrier, includes the steps of setting the subcode symbols at said predetermined recordable positions to a first predetermined symbol value during mastering, calculating, for each subcode frame, error detection data over certain subcode data of said subcode frame including said subcode symbols set to said first predetermined symbol value, storing said error detection data at auxiliary data positions in said subcode frame, and setting error detection data positions in said subcode frame to a second predetermined symbol value, wherein said predetermined recordable positions of said subcode frames are provided for recording of user data to it during writing of data, and said error detection data positions of said subcode frames are provided for recording correct error detection data, calculated after recording said user data to said predetermined recordable positions, to it.

11 Claims, 5 Drawing Sheets

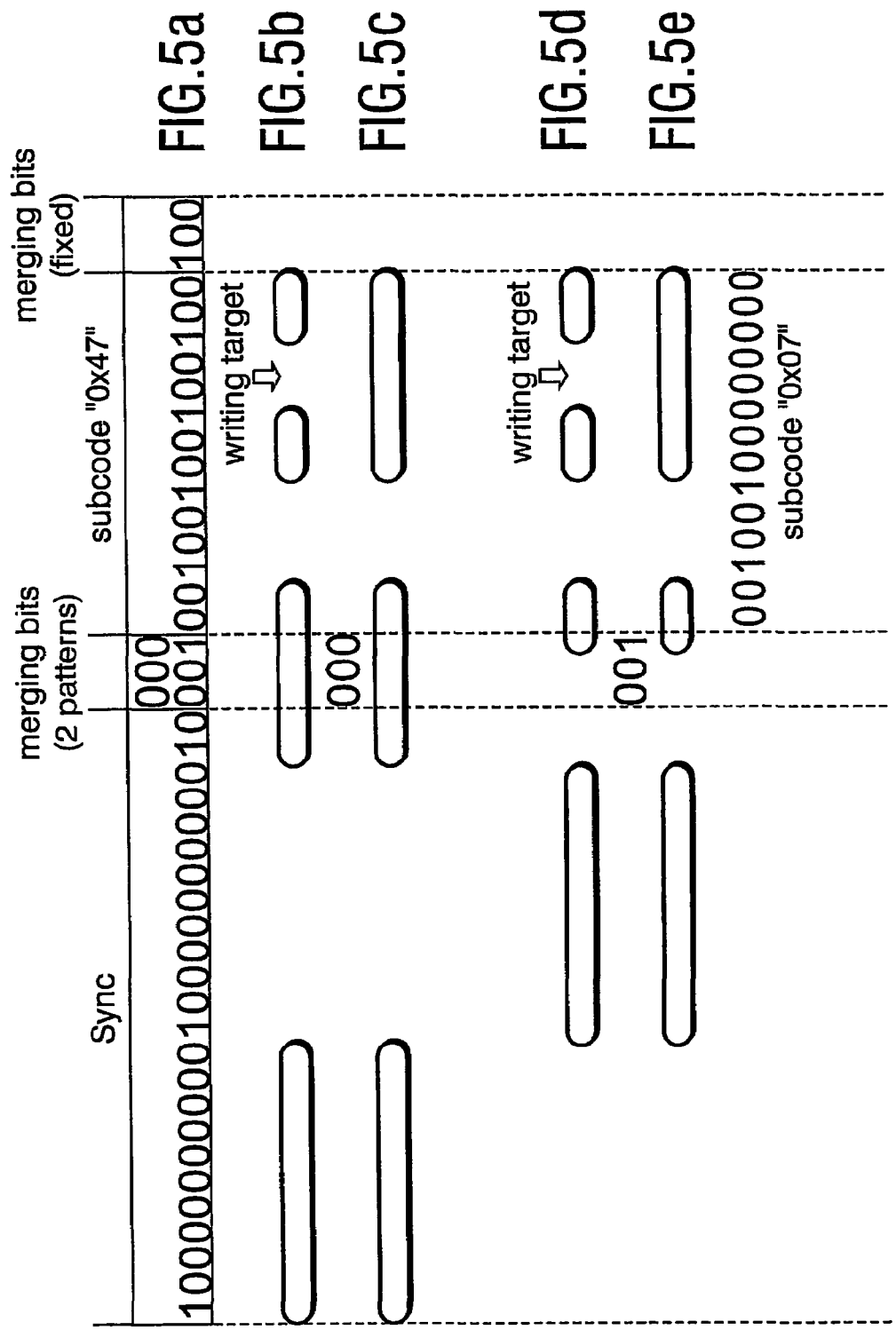

READ-ONLY RECORD CARRIER WITH RECORDABLE AREA IN SUBCODE CHANNEL

BACKGROUND OF THE INVENTION

1. Field of the Invention

The invention relates to a method and an apparatus for providing a read-only record carrier on which user data can be recorded at predetermined recordable positions of subcode frames of a subcode channel after mastering of said record carrier. The invention relates further to a method of and an apparatus for writing user data onto such a read-only record carrier, to a computer program for implementing said methods, and to a record carrier mastered according to said method.

2. Description of the Related Art

It is often desired that even on a read-only record carrier, such as a CD-audio or CD-ROM, after mastering certain user data can be stored on the record carrier. In particular, it is desired to generate a unique identifier of said record carrier by the distributor or sales point of said record carrier and/or to provide copy protection data on said record carrier mainly to prevent a user from making unauthorized copies of said record carrier, or to enable replay devices to distinguish between an original and a copy of a record carrier.

SUMMARY OF THE INVENTION

It is therefore an object of the present invention to provide a read-only record carrier on which user data can be recorded after mastering. In addition, a corresponding method of writing user data to such a record carrier shall be provided.

Said object is achieved according to the present invention by a method comprising the steps of:

setting the subcode symbols at said predetermined recordable positions to a first predetermined symbol value during mastering, calculating, for each subcode frame, error detection data over certain subcode data of said subcode frame including said subcode symbols set to said first predetermined symbol value, storing said error detection data at auxiliary data positions in said subcode frame, and setting error detection data positions in said subcode frame to a second predetermined symbol value, said predetermined recordable positions of said subcode frames being provided for recording of user data to it during writing of data, and said error detection data positions of said subcode frames being provided for recording correct error detection data, calculated after recording said user data to said predetermined recordable positions, to it.

A method of writing user data to such a record carrier comprises the steps of:

recording user data to said predetermined recordable positions of said subcode frames during writing of data, and recording correct error detection data, calculated after recording said user data, to said error detection data positions of said subcode frames.

The present invention is based on the idea of providing a possibility to modify certain symbols of the subcode channel even after mastering the record carrier. Therefore, the symbols at predetermined recordable positions of subcode frames and error detection data positions are set to a predetermined value which can be changed after mastering. However, in order to achieve that the error detection data is always correct, both after mastering, i.e., before writing of said particular user data, and after writing said user data, said error detection data are calculated after mastering. While the normal cyclic redundancy check (CRC) data is inverted and stored in the conventional CRC position, said data is not inverted and is stored in the auxiliary data positions. Said auxiliary data positions can but must not be recordable after mastering, so that, in the latter case, the values at said auxiliary data positions remain unchanged even after the later writing the user data at the recordable positions.

According to a preferred embodiment, said subcode channel is the Q-channel as defined in the Red Book for CD audio, or as defined in the Yellow Book for CD-ROM. The error detection data thus preferably comprises cyclic redundancy check data which are preferably calculated over a control field, an address field and a user data field.

To enable the recording of user data even after mastering, the subcode bytes comprise subcode symbols of all subcode channels, i.e., for CD audio of subcode channels P, Q, R, S, T, U, V, W. Said subcode bytes are set to value 0x47 during mastering so that the Q-channel symbol has bit value 1. Said value 0x47 can be easily changed into value 0x07 even after mastering so that the Q-channel symbol has bit value 0 by writing a mark at a predetermined position so that the pattern 3T pit-3T land-3T pit is modified into the pattern 9T pit. Preferably, merging bits are chosen such that the polarity of EFM word corresponding with 0x47 (corresponding EFM word is 00100100100100) starts with a 'pit'.

BRIEF DESCRIPTION OF THE DRAWINGS

The invention will now be explained more in detail with reference to the drawings, in which:

FIGS. 5a–5e illustrate how user data can be recorded after mastering.

DESCRIPTION OF THE PREFERRED EMBODIMENTS

Figure 1:
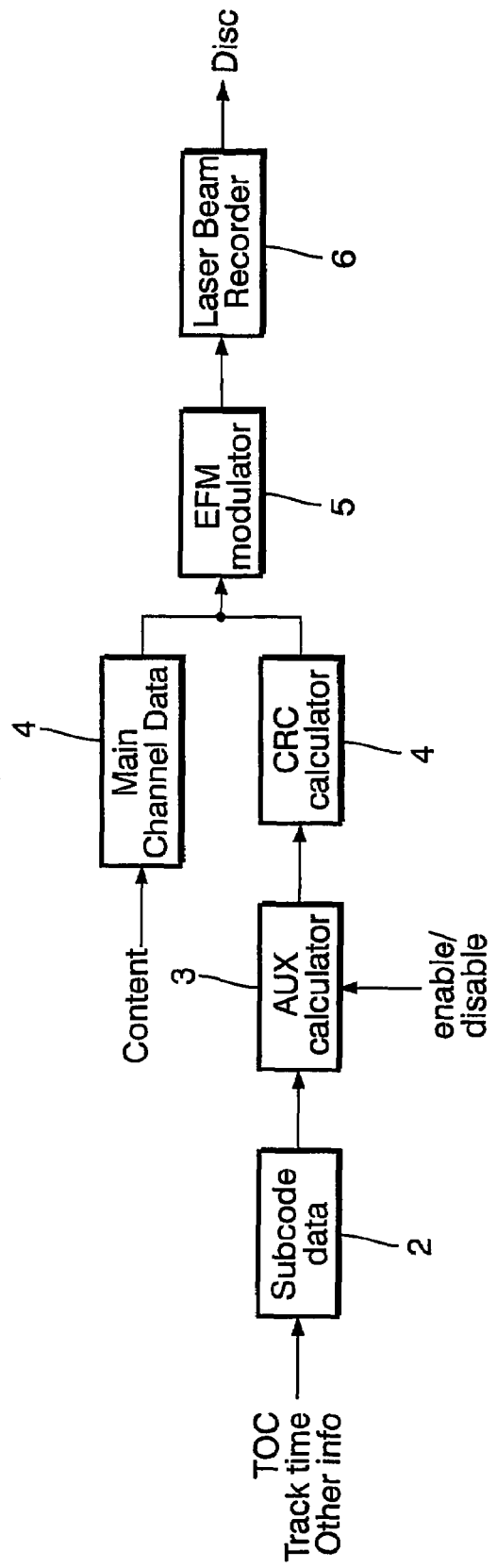
FIG. 1 shows a block diagram of an encoder according to the present invention.

FIG. 1 shows a block diagram of an encoder according to the present invention as used during mastering of a disc. Content, such as audio, video or software data, is inputted into a main channel data unit 1 for processing, in particular encoding, said content into main channel data. Other information, in particular general data, such as table of content (TOC) data and track time information, is inputted into a subcode data unit 2 for processing, in particular encoding, said data into subcode data. An AUX calculator 3, which can be enabled or disabled, is provided, according to the present invention, in the processing path of said subcode data which can be used to provide the possibility of writing user data at certain predetermined positions of a subcode channel even after mastering. Auxiliary (AUX) data positions are therefore provided in subcode frames of at least one subcode channel to which certain data will be recorded as will be explained below. Error detection data, in particular, cyclic redundancy check (CRC) data, are calculated for the subcode data to be stored in subcode frames by a CRC calculator 4. An EFM (Eight-to-Fourteen Modulation) modulator 5 converts the data of the main channel and the sub-channels into channel bits of a data stream which is finally recorded on the disc by a laser beam recorder 6. The general layout and function of an encoder for recording data onto an optical disc is well known and shall therefore not be described further. For particular details, reference is made to standards for optical recording, such as the Red Book for CD audio or the Yellow Book for CD-ROM.

Figure 2:
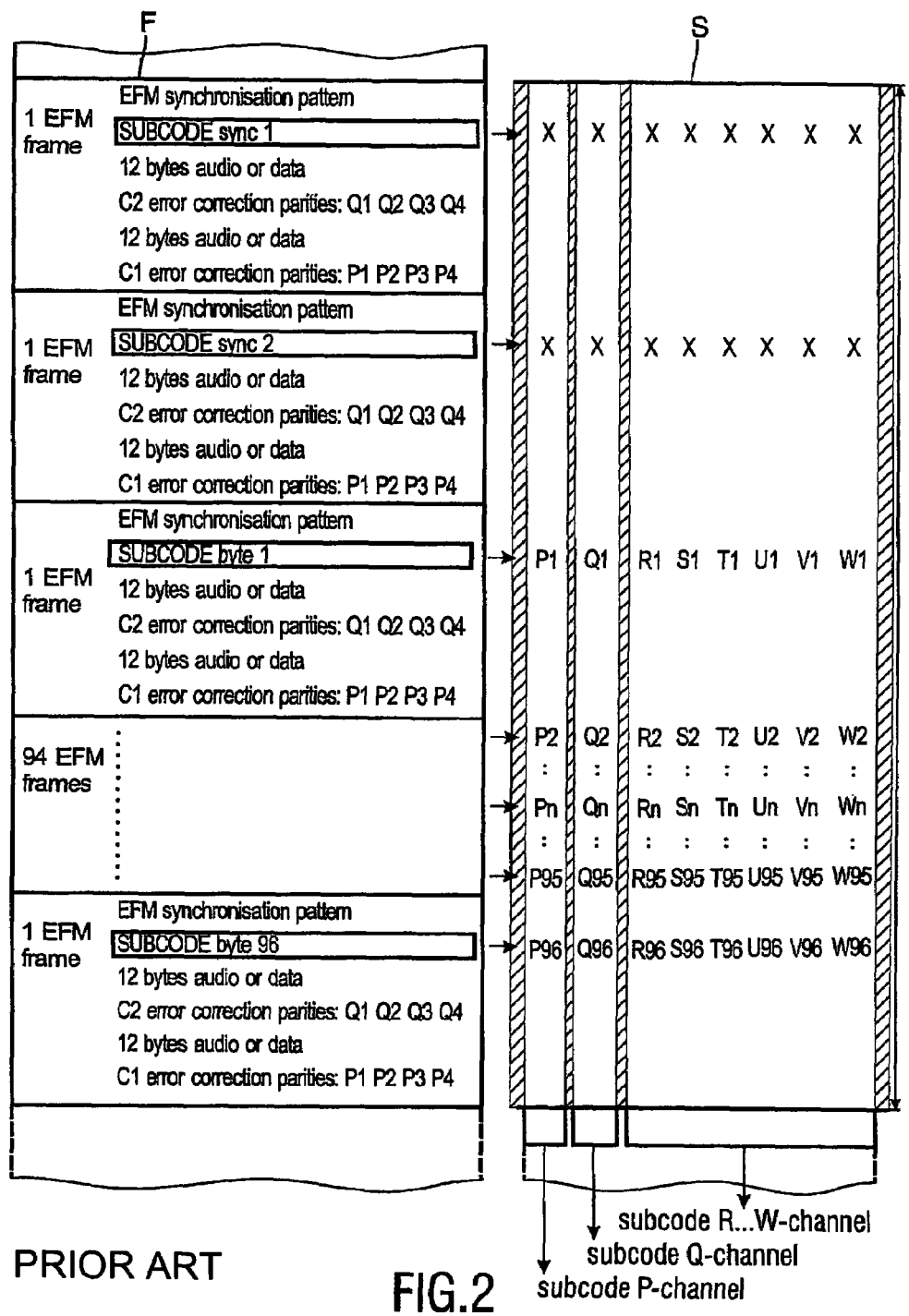
FIG. 2 illustrates the frame structure of the subcode channels in CD audio.

FIG. 2 shows the well-known structure of EFM frames and subcode frames as used in CD audio. One frame F of channel bits comprises 98 EFM frames each comprising an EFM synchronization pattern, a subcode byte, user data bytes and error detection parities. The 98 subcode bytes together form a subcode data block S comprising 8 subcode frames of 8 different subcode channels, i.e., the P, Q, R, S, T, U, V, W subcode channels. Each subcode channel consists of 98 subcode bits that are built by 2 synchronization bits and 96 data bits.

Figure 3:
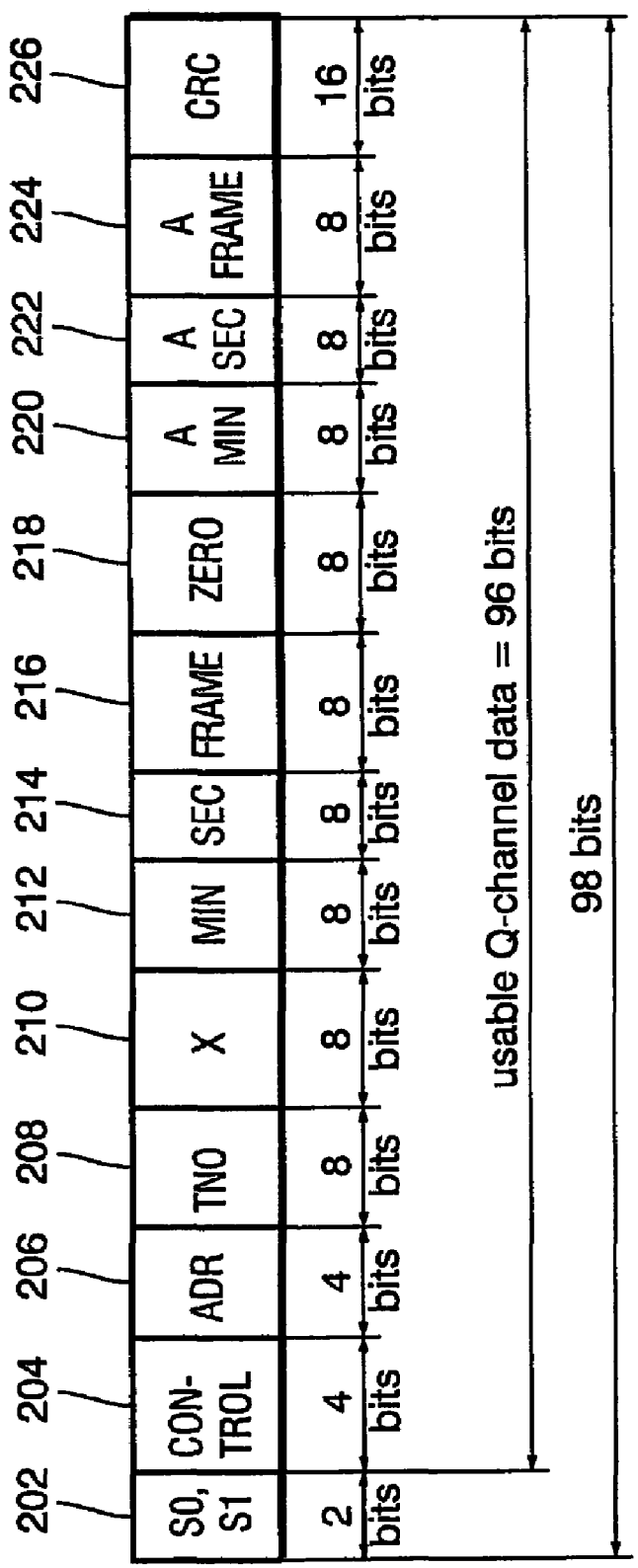
FIG. 3 illustrates the frame format of a Q-channel subcode frame.

FIG. 3 illustrates the data content of the subcode frame of the Q-channel in CD technology. In the shown non-limiting embodiment, the Q-subcode frame contains, in the following order, two synchronization pattern bits 202 which contain bits from special symbols S0 and S1 (2 bits), a control field 204 (CONTROL, 4 bits), an address field 206 (ADR, 4 bits), a track number field 208 (TNO, 8 bits), a track number index field 210 (X, 8 bits), a track time minutes field 212 (MIN, 8 bits), a track time seconds field 214 (SEC, 8 bits), a track time frame field 216 (FRAME, 8 bits), a field of zero bits 218 (ZERO, 8 bits), an absolute time minutes field 220 (A MIN, 8 bits), an absolute time seconds field 222 (A SEC, 8 bits), an absolute time frame field 224 (A FRAME, 8 bits), and a cyclic redundancy check field 226 (CRC, 16 bits).

Figure 4A:
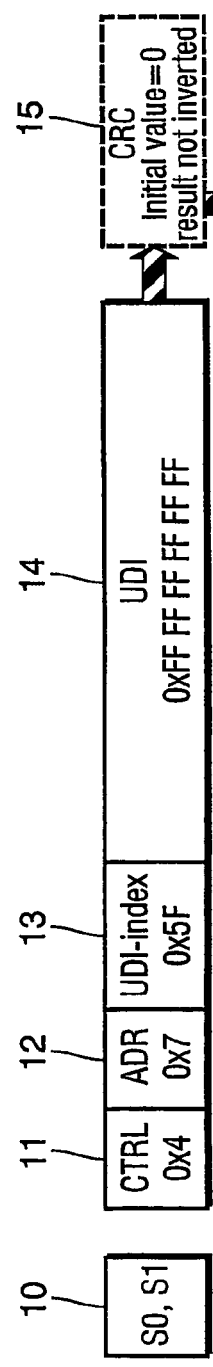
FIGS. 4a–4d illustrate the method according to the present invention.

With reference to FIGS. 4a–4d, a particular embodiment of the present invention shall now be explained in more detail. FIG. 4a shows a simple layout of a subcode frame of the Q-channel. According to said layout, the subcode frame comprises a synchronization field 10, a control field 11, an address field 12, a UDI (Unique Disc Identifier) index field 13 and a UDI field 14. The UDI field 14 is provided for storing a unique disc identifier uniquely identifying a particular disc. Such an UDI is often used in copy protection systems. In particular embodiments of replay devices, said UDI is required to enable playback or copying of content stored on a disc. However, if it is detected that the disc that is to be played back or copied is not an original disc but an illegal copy, then the output of the UDI can be suppressed so that playback or copying is not possible.

Figure 4B:
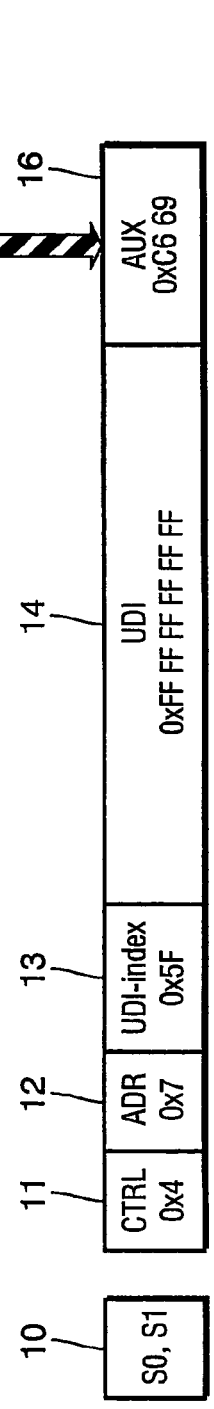
Figure 4C:
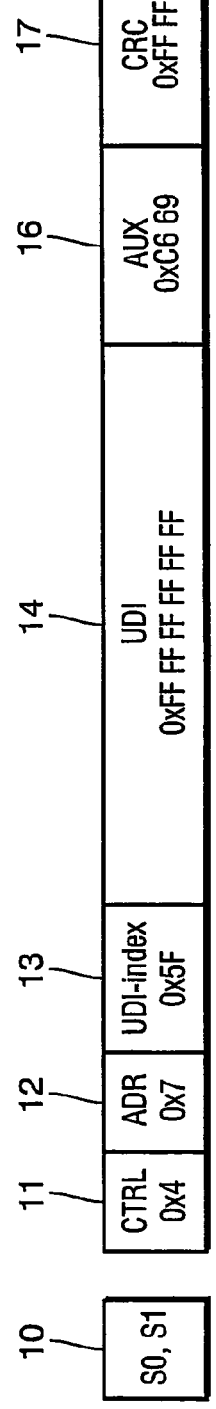

According to the present invention, during mastering, the UDI field 14 is set to 0xFF FF FF FF FF FF, i.e., all subcode bits of the UDI field 14 are set to bit value 1. Error detection data CRC are thereafter calculated over the control field 11, the address field 12, the UDI index field 13 and the UDI field 14. However, the calculated auxiliary CRC data 15 are not inverted and are stored in an auxiliary data field 16 instead of the normal CRC field, as shown in FIG. 4b. During calculation of said auxiliary CRC data, it is taken into account that the initial value is zero and the result is not inverted so that the CRC data stored in CRC data field 17 of the complete subcode frame shown in FIG. 4c has value 0xFF FF, i.e., all bits of the CRC data field 17 have bit value 1. Thus, the CRC stored in the CRC data field 17 is correct for the data stored in the remaining fields 11, 12, 13, 14 and 16 of the subcode frame after mastering.

Figure 4D:
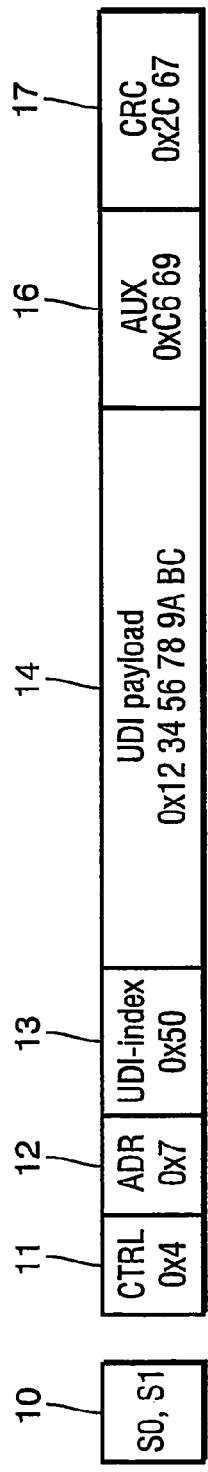

According to the present invention, at least the UDI field 14 and the CRC data field 17 are recordable after mastering, i.e., user data can be stored in the UDI field 14 and new corrected CRC data, taking into account a new payload in the UDI field 14, can be calculated and stored in the CRC data field 17. A user, e.g., the content owner or a sales person, can assign a particular unique identifier UDI to the disc and store it in the UDI field 14 as shown in FIG. 4d. Thereafter the CRC data are again calculated over the control field 11, the address field 12, the UDI index field 13, the UDI field 14 and the AUX field 16, and the correct CRC data are stored in the CRC data field 17. Thus, the CRC data are correct before and after writing the user data into the UDI field 14. It is thus possible to use a stamper-unique identifier and an optional disc-unique identifier at the same time.

FIGS. 5a–5e illustrate how the writing of user bits after mastering is enabled. FIG. 5a shows the EFM synchronization pattern followed by two possibilities of three merging bits for polarity control, followed by a subcode byte comprising a subcode bit for each subcode channel, followed by a fixed merging bit pattern. To enable the writing of user bits into the subcode frame of the Q-channel, the subcode byte is set to byte value 0x47 which channel word corresponds to data word 01000111 (=71 in decimal format). This means that the subcode bit for the Q-channel is set to bit value 1. FIG. 5a shows the pattern of pits and lands for said bit pattern.

To change the bit value of the subcode bit for the Q-channel, the subcode byte value has to be changed from byte value 0x47 to 0x07, the bit pattern of which is shown at the bottom. Said subcode byte value 0x07 corresponds to a data word 00000111 (=7 in decimal format), i.e., the subcode bit of the Q-channel has bit value 0. This can be achieved by writing a 3T mark indicated by the arrow in FIG. 5b, resulting in a pit and land pattern as shown in FIG. 5c. The sequence of 3T pit-3T land-3T pit shown in FIG. 5b is thus modified into the pattern 9T pit shown in FIG. 5c.

FIG. 5d shows the pit and land pattern before the recording of user data, starting with the opposite polarity of the pits and lands and using a second merging bit pattern between the synchronization pattern and the subcode byte. FIG. 5e shows the pit and land pattern after changing the subcode byte from value 0x47 into 0x07.

It should be noted that the present invention is not limited to the above-described embodiments. It can be applied to other record carriers as well, and it can be modified such that user data can also be stored in other subcode channels after mastering. Further, the number and the positions of recordable data bits within a subcode frame can be varied compared to the above-described embodiment. It could be provided that not only the UDI field 14 and the CRC data field 17 as shown in FIGS. 4a–4d can be modified after mastering, but that also the control field 11, the address field 12, the UDI-index field 13 and/or the auxiliary data field 16 can be modified after mastering.

The invention claimed is:

1. A method of providing a read-only record carrier on which user data can be recorded at predetermined recordable positions of subcode frames of a subcode channel after mastering of said record carrier, said method comprising the steps of:

setting the subcode symbols at said predetermined recordable positions to a first predetermined symbol value during mastering;

calculating, for each subcode frame, error detections data over certain subcode data of said subcode frame including said subcode symbols set to said first predetermined symbol value;

storing said error detection data at auxiliary data positions in said subcode frame; and setting error detection data positions in said subcode frame to a second predetermined symbol value, wherein said predetermined recordable positions of said subcode frames are provided for recording of user data to said predetermined recordable positions during writing of data, and said error detection data positions of said subcode frames are provided for recording correct error detection data, calculated after recording said user data to said predetermined recordable positions, to said error detection data positions.

2. The method as claimed in claim 1, wherein all subcode bits of said first and said second predetermined symbol values are set to bit value 1.

3. The method as claimed in claim 1, wherein said user data comprise a unique identifier uniquely identifying said record carrier after recording said unique identifier at said predetermined recordable positions of said subcode frames.

4. The method as claimed in claim 1, wherein said subcode frames are part of a subcode Q-channel, particularly of an optical recording system for read-only optical discs.

5. The method as claimed in claim 4, wherein said subcode frames comprise a synchronization field, a control field, an address field, a user data field, an auxiliary data field and an error detection data field, at least said user data field and said error detection data field being recordable after mastering.

6. A record carrier mastered according to a method as claimed in claim 1, user data being recordable at predetermined recordable positions of subcode frames of a subcode channel after mastering of said record carrier, wherein:
the subcode symbols at said predetermined recordable positions are set to a first predetermined symbol value;
error detection data, calculated for each subcode frame over certain subcode data of said subcode frame including said subcode symbols set to said first predetermined symbol value, are stored at auxiliary data positions in said subcode frame; and
error detection data positions in said subcode frame are set to a second predetermined symbol value, said predetermined recordable positions of said subcode frames being provided for recording of user data to said predetermined recordable positions during writing of data, and said error detection data positions of said subcode frames being provided for recording correct error detection data, calculated after recording said user data to said predetermined recordable positions, to said error detection data positions.

7. A computer program for implementing a method as claimed in claim 1 comprising program code means for causing a computer to carry out the steps of said method when said method is run on a computer.

8. A method of providing a read-only record carrier on which user data can be recorded at predetermined recordable positions of subcode frames of a subcode channel after mastering of said record carrier, said method comprising the steps of:
setting the subcode symbols at said predetermined recordable positions to a first predetermined symbol value during mastering;
calculating, for each subcode frame, error detections data over certain subcode data of said subcode frame including said subcode symbols set to said first predetermined symbol value;
storing said error detection data at auxiliary data positions in said subcode frame; and
setting error detection data positions in said subcode frame to a second predetermined symbol value, wherein said predetermined recordable positions of said subcode frames are provided for recording of user data to said predetermined recordable positions during writing of data, and said error detection data positions of said subcode frames are provided for recording correct error detection data, calculated after recording said user data to said predetermined recordable positions, to said error detection data positions,
wherein said subcode frames are part of a subcode Q-channel, particularly of an optical recording system for read-only optical discs, and wherein subcode bytes comprising a subcode symbol from each subcode channel are set to byte value 0x47 during mastering so that, for recording user data at said predetermined recordable positions, said subcode bytes can be set to 0x07 by writing a mark at a predetermined location in said subcode byte.

9. A method of writing user data on a read-only record carrier at predetermined recordable positions of subcode frames of a subcode channel, wherein, during mastering, the subcode symbols at said predetermined recordable positions are set to a first predetermined symbol value, for each subcode frame, error detection data are calculated over certain subcode data of said subcode frame including said subcode symbols set to said first predetermined symbol value, said error detection data are stored at auxiliary data positions in said subcode frame, and error detection data positions in said subcode frame are set to a second predetermined symbol value, said method comprising the steps of:
recording user data to said predetermined recordable positions of said subcode frames during writing of data; and
recording correct error detection data, calculated after recording said user data, to said error detection data positions of said subcode frames.

10. An apparatus for providing a read-only record carrier on which user data can be recorded at predetermined recordable positions of subcode frames of a subcode channel after mastering of said record carrier, said apparatus comprising:
means for setting the subcode symbols at said predetermined recordable positions to a first predetermined symbol value during mastering;
means for calculating, for each subcode frame, error detection data over certain subcode data of said subcode frame including said subcode symbol set to said first predetermined symbol value;
means for storing said error detection data at auxiliary data positions in said subcode frame; and
means for setting error detection data positions in said subcode frame to a second predetermined value, wherein said predetermined recordable positions of said subcode frame are provided for recording of user data to said predetermined recordable positions during writing of data, and said error detection data positions of said subcode frames are provided for recording correct error detection data, calculated after recording said user data to said predetermined recordable positions, to said error detection data positions.

11. An apparatus for writing user data on a read-only record carrier at predetermined recordable positions of subcode frames of a subcode channel, wherein, during mastering, the subcode symbols at said predetermined recordable positions are set to a first predetermined symbol value, said error detection data are stored at auxiliary data positions in said subcode frame, and error detection data positions in said subcode frame are set to a second predetermined symbol value, said apparatus comprising:
means for recording user data to said predetermined recordable positions of said subcode frames during writing of data; and
means for recording correct error detection data, calculated after recording said user data, to said error detection data positions of said subcode frames.

* * * * *